Jan. 5, 1965  H. S. POTGIETER  3,163,946
EARTH MOVING SCRAPER
Filed Aug. 6, 1962  4 Sheets-Sheet 1
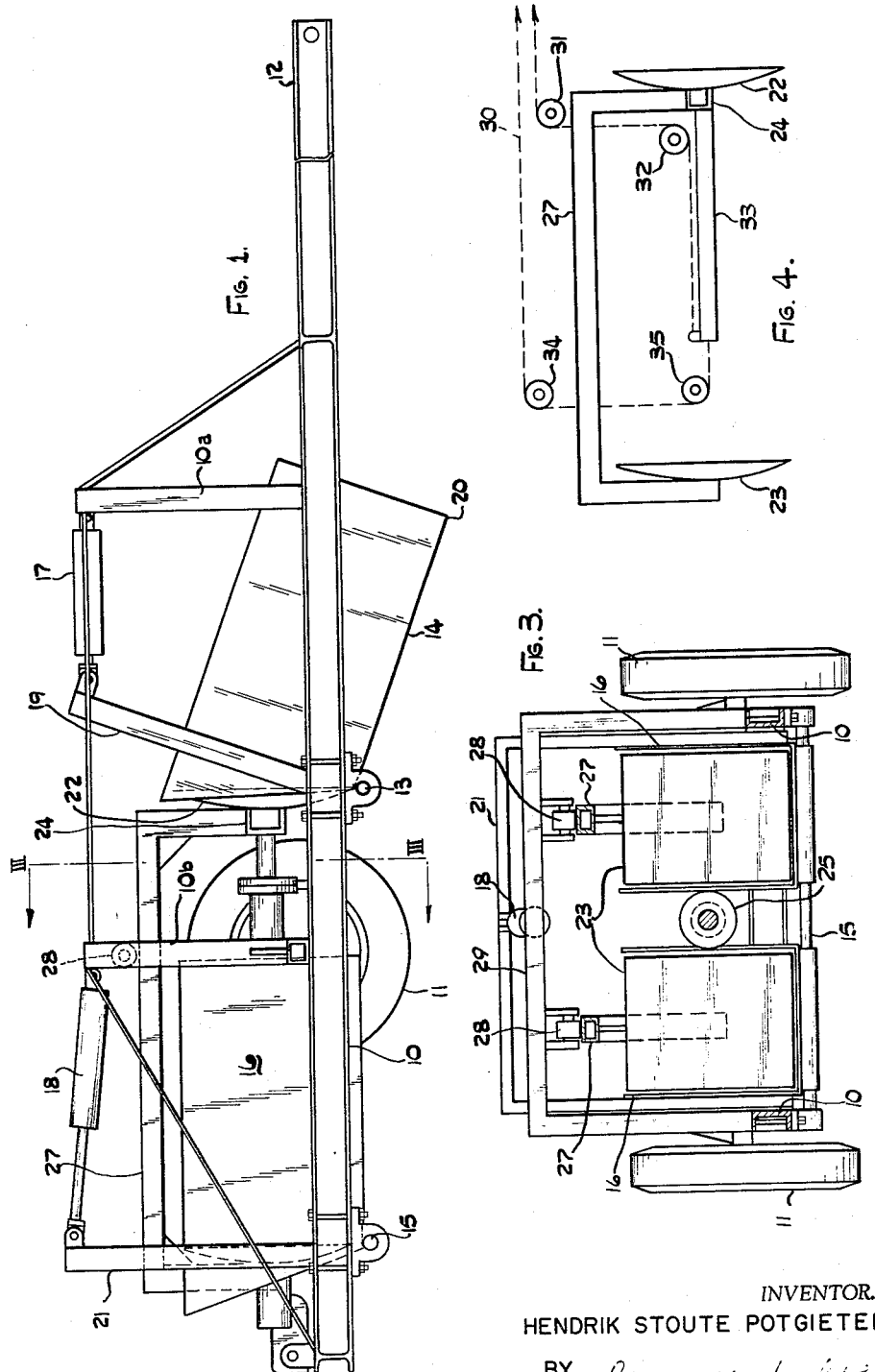
INVENTOR.
HENDRIK STOUTE POTGIETER
BY *Stowell & Stowell*
ATTORNEYS

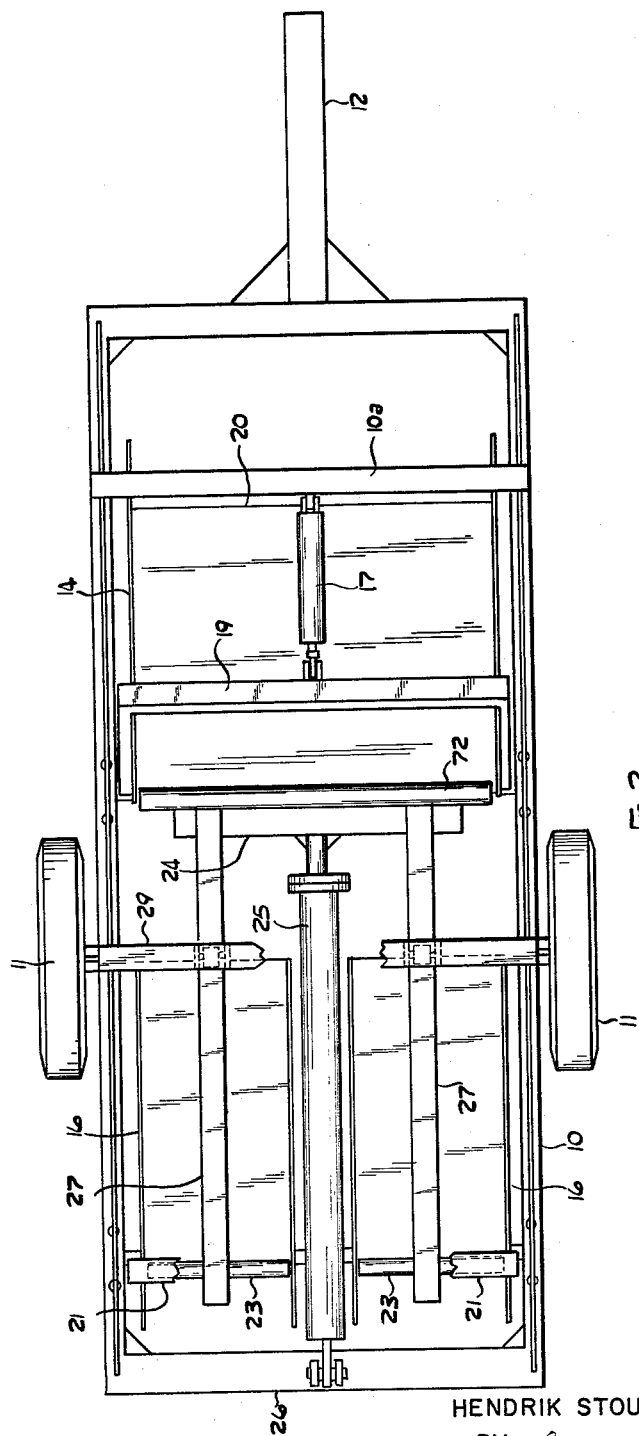

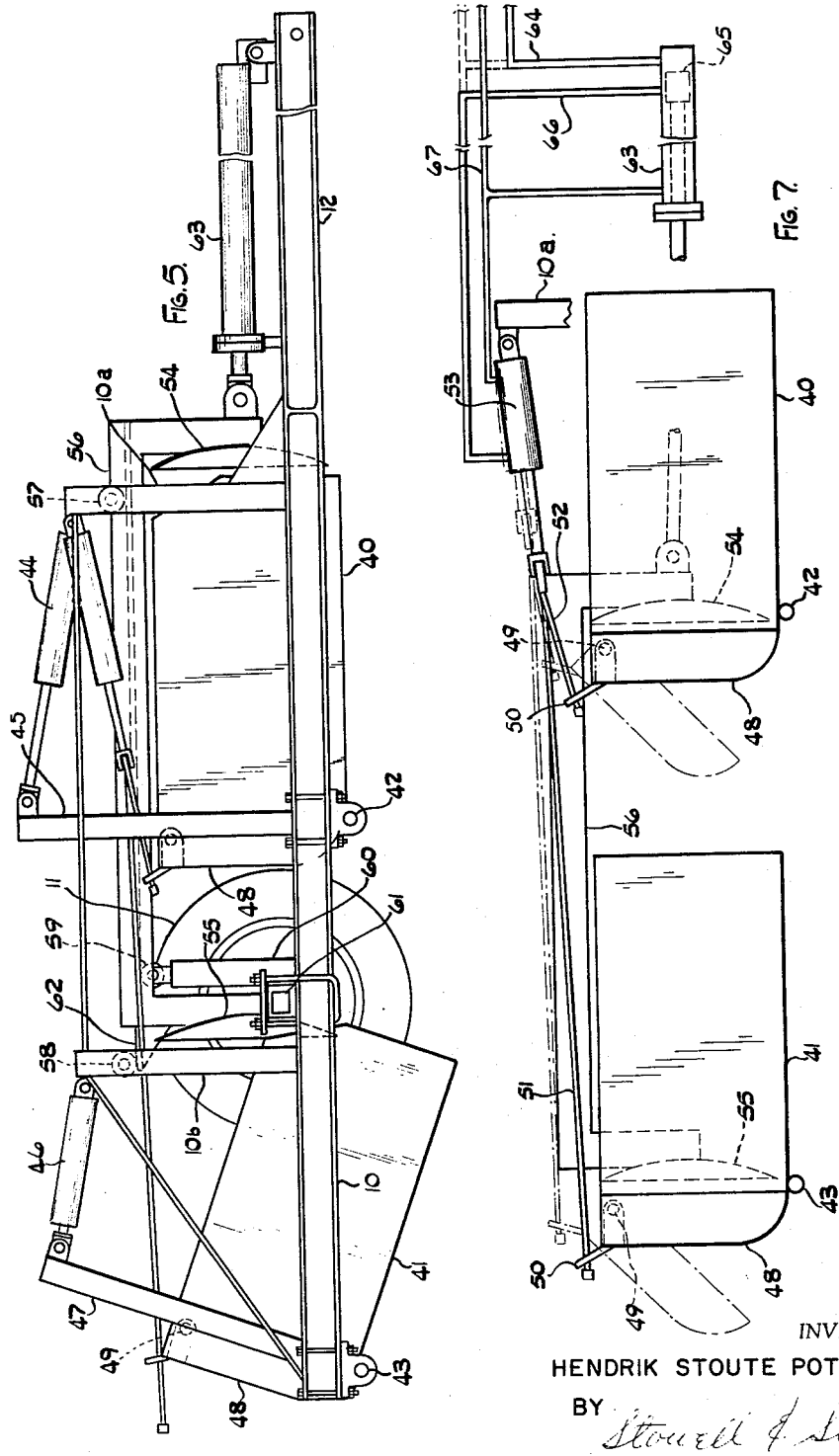

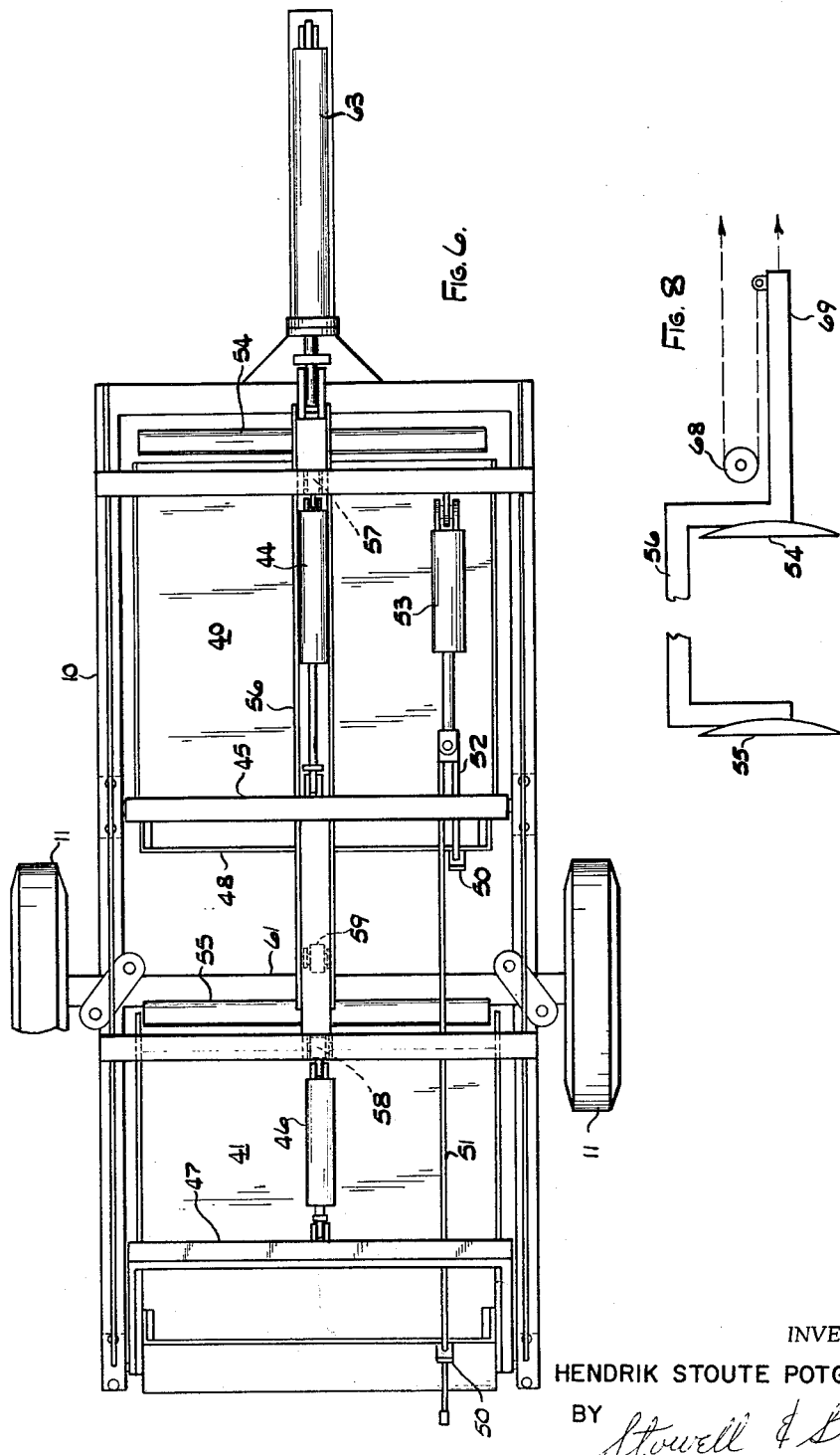

United States Patent Office 3,163,946
Patented Jan. 5, 1965

3,163,946
EARTH MOVING SCRAPER
Hendrik S. Potgieter, "Hooglande," Zastron, Orange
Free State, Republic of South Africa
Filed Aug. 6, 1962, Ser. No. 215,137
Claims priority, application Republic of South Africa,
Aug 7, 1961, R 61/992; Oct. 25, 1961, R 61/2,123
13 Claims. (Cl. 37—129)

This invention relates to earth moving equipment more particularly of the kind comprising one or more self-loading scoops mounted on a wheeled chassis frame and adapted to be operated by tractor means for filling, carrying and load dumping purposes.

According to the invention, an earth moving implement comprises; a wheeled chassis frame; at least one earth scoop, pivotally mounted in the frame for tilting movement about a transverse axis, and having an earth digging lip at its leading end for self-loading purposes; power-operated means for controlling tilting movement of the scoop to and from its loading and load carrying positions; a transverse wall mounted for longitudinal displacement along the scoop between the side walls thereof; power-operated means for moving such transverse wall along the scoop to cause discharge of a load of material carried therein from one end thereof; and means for coupling the chassis frame to a towing vehicle, which vehicle also supplies power to the operating means controlling the scoop and the transverse longitudinally displaceable wall coacting therewith.

In one construction the transverse longitudinally displaceable wall is arranged to be moved forwardly to discharge a load from the leading end of a scoop. In an alternative construction such transverse longitudinally displaceable wall is arranged to be moved rearwardly to discharge a load from the rear end of a scoop.

Preferably the power-operated means for controlling the tilting movements of a scoop and effecting longitudinal movement of a transverse wall within a scoop for unloading purposes, are in the form of hydraulic cylinder assemblies suitably anchored on the chassis frame and arranged to receive operating pressure fluid from pressure pump means on the towing vehicle.

When two or more scoops are provided, a single power-operated device, such as an hydraulic cylinder, may be arranged to operate both or all of the transverse longitudinally displaceable walls simultaneously for unloading purposes. When two or more scoops are arranged tandem fashion, the transverse walls are preferably fixed to downwardly projecting parts of at least one longitudinally movable and guided frame, and wherein the power-operated means is connected to such frame or frames.

According to one construction two or more scoops may be provided in an implement and arranged one behind the other tandem fashion. Alternatively at least two scoops of those provided may be of reduced width and arranged in side-by-side relationship. Preferably these laterally disposed scoops will be located in a rear position in the implement chassis frame. The pivotal axis of a scoop is preferably located at or adjacent to its rear end and is below the floor thereof.

To enable the invention to be more clearly understood and carried into practice, reference is now made to the accompanying drawings in which like references denote like parts throughout the several views.

In the drawings:

FIGURE 1 is a side elevation of an earth moving implement constructed according to the invention, having three earth scoops and showing the front scoop in its self-loading position and with the nearside road wheel omitted for clarity.

FIGURE 2 is a part-cut-away plan view taken on FIGURE 1 and omitting the rear hydraulic cylinder assembly operating the two rear scoops.

FIGURE 3 is a sectional end view taken on line III—III of FIGURE 1.

FIGURE 4 is a fragmentary diagrammatic side elevation illustrating a method of operating the transverse longitudinally displaceable walls of the scoops for load dumping purposes, by the use of a winch and cable element instead of an hydraulic cylinder assembly.

FIGURE 5 is a side elevation of a modified form of earth moving implement, showing the rear scoop in its self-loading position, which differs from that of FIGURES 1 to 3, in that the scoops are arranged to be unloaded in a rearward direction.

FIGURE 6 is a plan view taken on FIGURE 5.

FIGURE 7 is a fragmentary side view of parts of the implement of FIGURES 5 and 6, showing how the two scoops are unloaded rearwardly; and FIGURE 8 is a fragmentary diagrammatic side elevation illustrating a method of operating the transverse longitudinally displaceable walls of the scoops for load dumping purposes, by the use of a winch and cable elements instead of the hydraulic cylinder assembly show in FIGURES 5 to 7.

Referring to FIGURES 1 to 3 of the drawings, reference 10 denotes a substantially rectangular chassis frame mounted on a pair of wheels 11 and provided at its front end with a drawbar 12 by means of which it is coupled to a tractor.

Pivotally mounted between the side frame members of the chassis frame 10 by a pivot shaft 13, is a single front full width earth scoop 14, while similarly pivotally mounted by a pivot shaft 15, are two substantially half width laterally spaced rear earth scoops 16. All three of these scoops are of channel form and each is pivotally mounted adjacent to what will be its rear bottom end.

The three scoops are moved about their pivot axes by hydraulic cylinder assemblies 17 and 18. The front scoop 14 is controlled in this respect by the hydraulic cylinder assembly 17, the piston rod of which is pivotally attached to a yoke member 19, the limbs of which are fixed to the side walls of the scoop 14, FIGURE 1 shows this scoop in its downwardly tilted filling position in which its front edge will dig into the earth for loading purposes. The cylinder assembly 17 is anchored to a suitable upright frame 10a.

The two rear scoops 16 are controlled by the hydraulic cylinder assembly 18, the piston rod of which is pivotally connected to a yoke member 21 the limbs of which are fixed one to each of the outer side walls of the two rear scoops 16. The cylinder assembly 18 is anchored to an upright frame 10b.

To effect unloading and to retain a load, the front scoop 14 is provided with a rear transverse wall 22, and each of the two rear scoops 16 is provided with similar rear transverse walls 23. The transverse wall 22 has a rigid transverse structural member 24 attached to its rear side and the piston rod of a centrally and longitudinally mounted unloading hydraulic cylinder assembly 25, is connected to this transverse member while the rear end of the hydraulic cylinder of such assembly is attached to the rear frame member 26 of the chassis frame 10. Also attached to the transverse member 24, by their two front arms, are two laterally spaced inverted elongated U-shaped frames 27, the rear arms of which are each attached to the rear side of one of the transverse walls 23 of the scoops 16. By this arrangement operation of the unloading hydraulic cylinder 25 will cause all three transverse walls 22 and 23 to be pushed forwardly simultaneously for unloading the three scoops by forward displacement of the load therein so that the material drops out over the front ends thereof.

It will be understood that in this unloading operation, the transverse walls 22 and 23 act as plunger members.

To ensure rectilinear movement of the frames 27, their top edges are arranged to coact with guide rollers 28 mounted on the cross frame member 29 of the upright frame 10b which also provides an anchorage for the hydraulic cylinder assembly 13.

FIGURE 4 illustrates diagrammatically an alternative method of providing power for the unloading operation. In this case a reversible winch mounted on the towing tractor is used. A cable 30 from such winch is arranged so that one end passes around sheaves 31 and 32 before being attached to the end of a rearwardly projecting member 33 connected to the transverse structural member 24, while the other end, after passing around the rearwardly disposed sheaves 34 and 35, is also attached to the end of the member 33. By this arrangement rotation of the winch in one direction will cause the transverse walls 22 and 23 to move forwardly for unloading purposes, while reverse rotation will return the transverse walls 22 and 23 to their rear or normal positions where they act as rear end walls for the scoops.

Reference is now made to FIGURES 5, 6 and 7, which illustrate a modified construction of the implement.

In this case, front and rear scoops 40 and 41 of full width are provided which are pivotally mounted just below their rear ends on pivot shafts 42, and 43. Tilting movement of the scoop 40 is controlled by an hydraulic cylinder assembly 44 connected between the top end of the upright frame 10a and the top end of a yoke member 45 the limbs of which are fixed to the side walls of the scoop. The rear scoop 41 is operable in a similar manner by the hydraulic cylinder assembly 46 connected between the top end of the upright frame 10b and the top end of a yoke member 47, having its two limbs fixed to the side walls of the scoop 41.

The rear open end of each of the scoops 40 and 41 is arranged to be closed by a hinged closure flap 48, pivotally mounted on the side walls by pins 49 so as to have a gravity-actuated self-closing characteristic. The flaps 48 may be arranged to be held in their closed positions by self-locking catches. To enable these flaps 48 to be opened for load dumping purposes, each is provided with a lever arm 50, each of which lever arms is respectively connected by cables 51 and 52 to an hydraulic cylinder assembly 53 anchored to the top end of the upright frame 10a.

To effect load dumping a transverse displaceable wall 54 is arranged to coact with the front end of scoop 40 and a similar wall 55 is arranged to coact with the front end of scoop 41. These two walls are attached to each of the two downwardly directed arms of an elongated inverted U-shaped frame 56 which is guided for rearward longitudinal movement, between two top rollers 57 and 58 and a bottom roller 59 supported on an upright 60 secured to the axle 61 of the two road wheels 11. The rollers 57 and 58 are supported on the upright frames 10a and 10b respectively. An extension 62 of the top of the frame 56 is provided to give initial guiding means. Preferably this top side of the frame 56 is made from an I-section steel structure member.

Attached to the front facing arm of the frame 56 is the piston rod of an unloading hydraulic cylinder assembly 63, the rear end of the cylinder of which is anchored to the front end of the drawbar 12.

The unloading operation will now be more clearly described with reference to FIGURE 7, which shows diagrammatically the pressure fluid conduits connected from the towing vehicle (not shown) to the hydraulic cylinder assemblies 53 and 63. It is assumed that the two scoops 40 and 41 have been filled one after the other in the known manner. Pressure fluid is now admitted to the outer end of the hydraulic cylinder assembly 63 by the conduit 64. The piston rod then causes the frame 56 with the attached displaceable walls 54 and 55 to move rearwardly along the scoops 40 and 41 plunger fashion to eject the loads from the rear ends thereof. After the piston 65 of the cylinder assembly 63 has moved a short distance, it uncovers an outlet in the cylinder wall connected by a conduit 66 to the front end of the cylinder assembly 53, which thereby causes its piston rod to be retracted and the closure flaps 48 to be opened by means of the cables 51 and 52. On completion of the unloading operation pressure fluid admitted via the conduit 67 to the opposite ends of the cylinders of the cylinder assemblies 63 and 53, will cause withdrawal of the walls 54 and 55 and slackening of the cables 51 and 52 to permit the closure flaps 48 to assume their normally closed positions by gravitational action.

FIGURE 8 illustrates an alternative method of supplying power for effecting the unloading operation. In this case one end of the cable from a reversible winch on the towing vehicle, after passing around a sheave 68 fixed to the drawbar 12, is attached to the end of an outward extension 69 of the frame 56, while the other end of this cable is directly attached to such end. With this arrangement it will be understood that rotation of the winch in one direction will cause the walls 54 and 55 to move rearwardly for off-loading purposes, while reverse rotation will bring them back to their inoperative positions.

I claim:

1. An improved earth moving implement which comprises, a wheel chassis frame, at least three forwardly directed earth scoops pivotally mounted in the frame for tilting movement about transverse axes, each scoop having an earth digging lip at its leading end for self-loading purposes; power operated means for controlling tilting movement of said scoops to and from their loading and load carrying positions; a transverse wall mounted for longitudinal displacement along each of said scoops between the side walls thereof; power operated means for operating said transverse walls along the respective scoops to cause discharge of loads of material carried therein from the ends thereof; and wherein two scoops of those provided are of reduced width and are arranged in side-by-side laterally spaced relationship.

2. An improved earth moving implement as claimed in claim 1, wherein the laterally disposed scoops are located in a rear position in the chassis frame of the implement.

3. An improved earth moving implement as claimed in claim 1, wherein said at least three scoops include a front full width scoop and two rear substantially half width scoops arranged in laterally spaced side-by-side relationship, and wherein tilting movement of the front scoop is controlled by a hydraulic cylinder assembly connected between an upright frame and the top end of a yoke member of the limbs of which are fixed to the side walls of the scoop, while the two rear scoops are similarly controlled by a second hydraulic cylinder assembly connected between a second upright frame and the top end of a second yoke member, the limbs of which are fixed one to each of the outer side walls of the two rear scoops.

4. An improved earth moving implement as claimed in claim 3, wherein to effect unloading and retain a load, the front scoop is provided with a rear transverse longitudinally displaceable wall, and each of the two rear scoops is provided with similar transverse longitudinally displaceable walls, wherein a longitudinally mounted unloading hydraulic cylinder assembly is connected between the rear of the transverse wall of the front scoop and a rear frame member of the chassis frame, and wherein attached to the rear side of such transverse wall by their two front arms, are two laterally spaced inverted elongated U-shaped frames the rear arms of which are each attached to one of the transverse walls of the two rear scoops, the arrangement being such that operation of this unloading hydraulic cylinder assembly, will cause all three transverse walls to be pushed forwardly in their respective scoops for simultaneous forward displacement of loads therein so that the material is ejected over the front leading ends thereof.

5. An improved earth moving implement as claimed in claim 4, wherein to ensure rectilinear movement of the two frames referred to, their top edges are arranged to coact with guide rollers mounted on a cross member of the aforementioned second upright frame.

6. An improved earth moving implement as claimed in claim 4, wherein the unloading hydraulic cylinder assembly is located in a space between the two rear scoops.

7. An improved earth moving implement as claimed in claim 4, wherein a rigid transverse structural member fixed to the rear side of the transverse longitudinally displaceable wall of the front scoop, provides the means for attachment thereto of the piston rod of the unloading hydraulic cylinder assembly and the front arms of the two inverted U-shaped frames.

8. An improved earth moving implement which comprises, a wheel chassis frame, at least two forwardly directed earth scoops pivotally mounted tandem fashion in the frame for tilting movement about transverse axes, and each having an earth digging lip at its leading end for self loading purposes, separate power operated means for controlling tilting movements of the scoops to and from their loading and load carrying positions to enable them to be loaded successively, wherein tilting movement of each scoop is controlled by an hydraulic cylinder assembly connected between an upright frame and the top end of a yoke member, the limbs of which are fixed to the side walls of the scoop; wherein each scoop has a front tranverse longitudinally displaceable wall coacting therewith, which walls are each fixed to one of two arms of an inverted elongated U-shaped frame arranged longitudinally, and wherein a front mounted inloading hydraulic cylinder assembly is connected to the front end of such frame so that operation thereof will cause both walls to move rearwardly along their respective scoops so as to eject the loads therein from their rear ends.

9. An improved earth moving implement as claimed in claim 8, wherein to ensure rectilinear movement of the frame, its top side is arranged to coact with guide rollers mounted in upright frame members.

10. An improved earth moving implement as claimed in claim 8, wherein the unloading hydraulic cylinder assembly is mounted on the drawbar of the implement, and the piston rod thereof is connected to the front arm of the frame carrying the longitudinally displaceable transverse walls.

11. An improved earth moving implement as claimed in claim 8, wherein the rear open end of each scoop is arranged to be closed by a hinged closure flap pivotally mounted on the side walls thereof so as to have a gravity-actuated self-closing characteristic.

12. An improved earth moving implement as claimed in claim 11, wherein to effect opening of the closure flaps for load dumping purposes, each is provided with a lever arm connected by flexible means, such as a cable, to an hydraulic cylinder assembly suitably anchored on an upright frame.

13. An improved earth moving implement as claimed in claim 12, wherein the hydraulic cylinder assembly operating the closure flaps is interconnected with the unloading hydraulic cylinder assembly, such that the closure flaps are automatically opened on initial movement of the piston of the unloading hydraulic cylinder assembly.

References Cited by the Examiner

UNITED STATES PATENTS

| | | | |
|---|---|---|---|
| 1,843,796 | 2/32 | Andrews et al. | 37—127 |
| 1,891,266 | 12/32 | LeTourneau. | |
| 2,112,105 | 3/38 | LeTourneau | 37—126 |
| 2,263,028 | 11/41 | Brownell | 37—124 |
| 2,315,363 | 3/43 | Armington | 37—127 |
| 2,490,310 | 12/49 | LeTourneau | 37—127 |
| 2,637,124 | 5/53 | LeTourneau | 37—126 |

FOREIGN PATENTS 218,059 11/61 Austria.

BENJAMIN HERSH, *Primary Examiner.*
ROBERT C. RIORDON, *Examiner.*